United States Patent Office 3,051,922
Patented Aug. 28, 1962

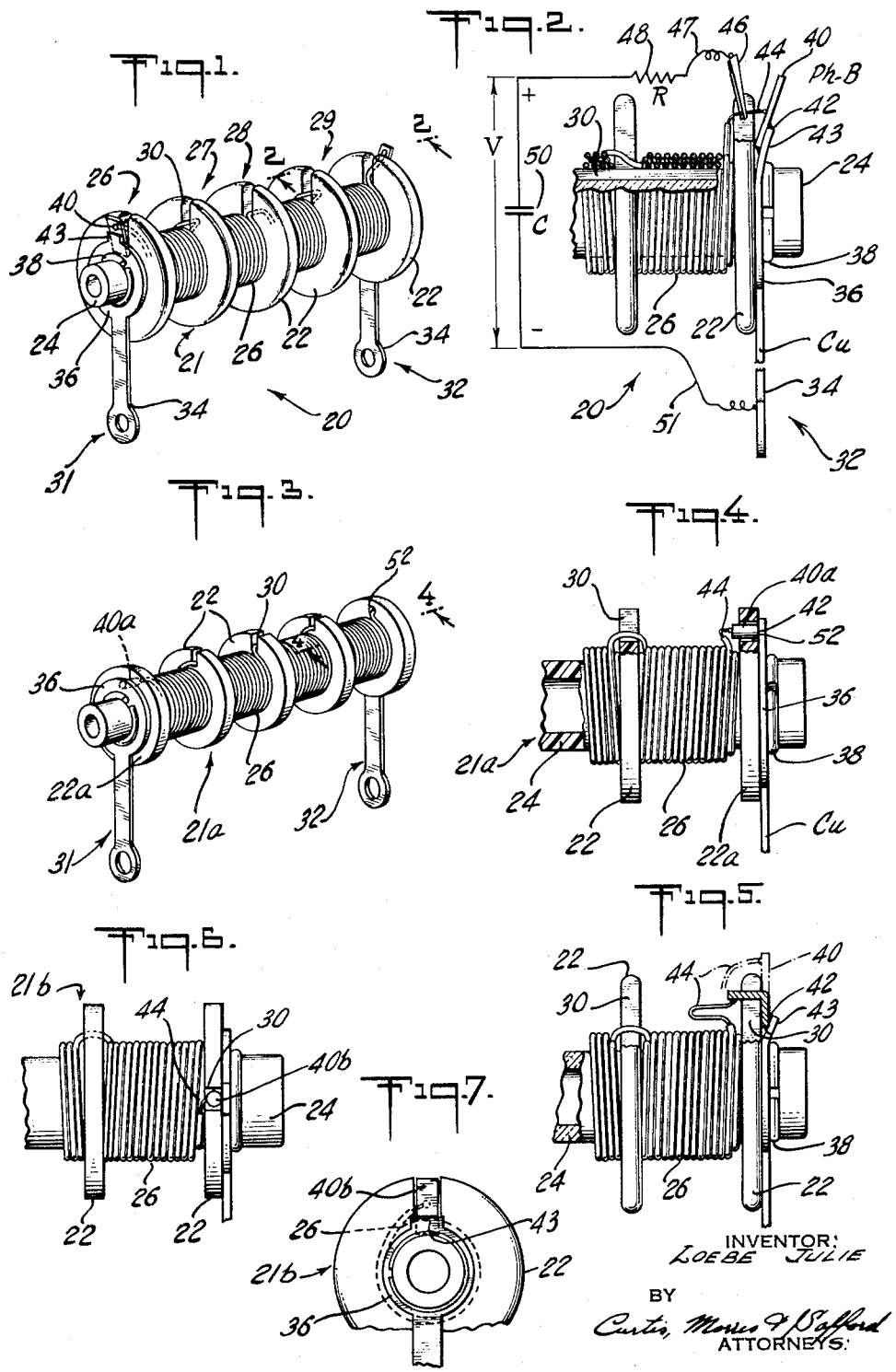

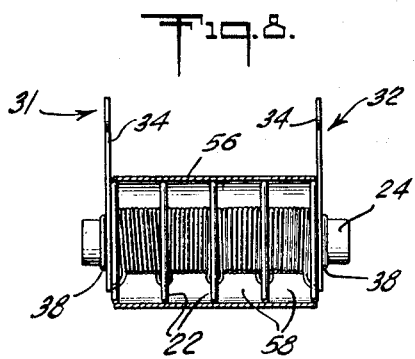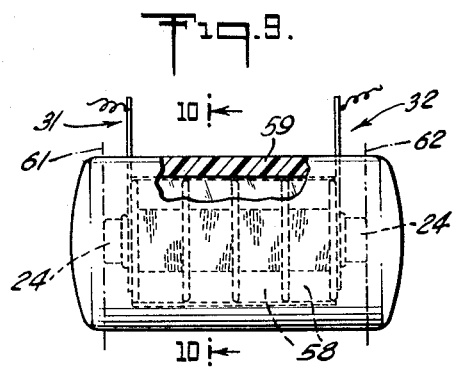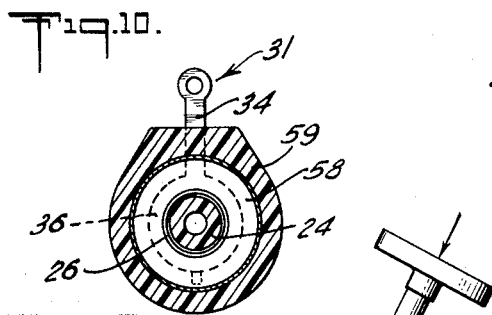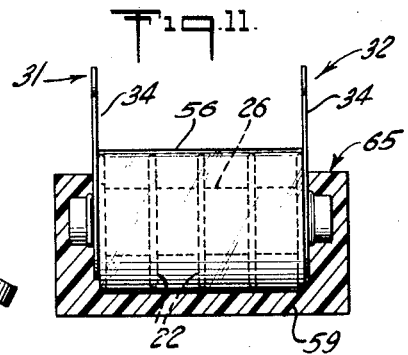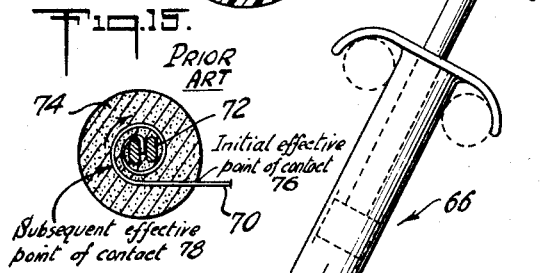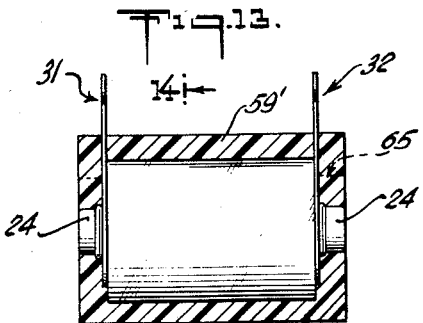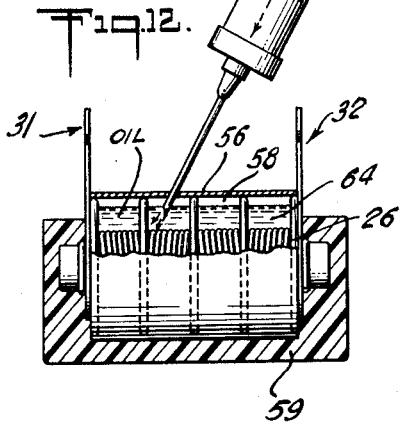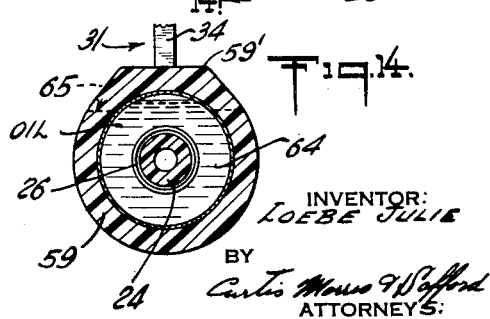
INVENTOR:
LOEBE JULIE

3,051,922
PRECISION RESISTANCE APPARATUS AND
METHOD OF MAKING
Loebe Julie, New York, N.Y., assignor to Julie Research Laboratories, Inc., New York, N.Y.
Original application Mar. 29, 1957, Ser. No. 649,439. Divided and this application Jan. 23, 1961, Ser. No. 97,401
5 Claims. (Cl. 338—234)

The present invention relates to precision resistance apparatus and methods of making precision resistance elements. More particularly, the present invention relates to precision wire-wound resistance apparatus and to methods of making wire-wound resistance elements having precisely predetermined resistance values. The methods and apparatus described herein as illustrative embodiments of the present invention enable the fabrication of resistors in which the location of the terminations at the ends of the resistance wire is determined with an accuracy commensurate with the diameter of the wire and wherein the precision of the termination is maintained over indefinitely long periods of time both during use and during idleness. In typical resistors embodying the present invention the locations of the terminations are determined with a precision of better than one part per million of the total length of the resistance wire.

Among the many advantages of the methods and apparatus of the present invention are those resulting from the fact that they enable the fabrication of wire-wound resistance elements whose effective lengths are precisely determinable as may be desired prior to final assembly with a precision of better than one part per million and without requiring the use of auxiliary or trimming resistance elements to reach the desired values. In accordance with certain prior art practices in making encapsulated precision resistors it is necessary to utilize an expensive and time-consuming procedure. The first step of this prior practice is to try to make a main wire-wound resistor having a value as close to but below the desired value as possible; the resistance wire is subjected to an aging procedure to stabilize its resistance characteristics; then the actual value of this main resistor is measured after assembly and aging; next an auxiliary trimming resistor wire is added in series with the main resistor; and finally the total value of the composite resistor is measured often following a second aging for the composite resistor.

This is a division of application No. 649,439 filed March 29, 1957.

In accordance with the methods and apparatus described herein as illustrative embodiments of the present invention a single resistance wire is utilized for each resistor. This wire is wound on the support, joined by butt-welding at one end to a terminal. Then it is aged by a suitable aging procedure as described below, and finally is cut to the desired length and its free end is butt-welded to the opposite terminal, providing a resistor whose actual resistance value after assembly is precisely determined in advance of final assembly and which is extremely stable in operation over an indefinitely long time.

Among the further advantages of the methods and apparatus of the present invention are their suitability for making individual highly precise wire-wound resistors having resistance values of any desired amount within the entire range from ten ohms up to ten million ohms and which maintain their effective points of termination precisely positioned so that the resistors are stable in their resistance values over indefinitely long periods of time.

In addition, these resistance elements exhibit relatively high mechanical strength and ability to withstand vibration. The methods and apparatus of the present invention enable the elimination of the complex arrangements and systems required by the prior art to secure precise results.

Among the advantages of the butt-welding methods and apparatus of the present invention is the fact that they enable the location of the effective point of connection at each end of the wire with respect to the length of the resistance wire to be determined with an absolute precision better than the diameter of the wire itself. In prior resistors the ends of the resistance wires are connected by arrangements which leave the location of the effective points of termination indefinite by amounts of thirty diameters of wire or more, for example, by beads of solder or the like. My tests have indicated that the effective point of connection between a high resistance wire and a relatively low resistance solder bead tends to travel along the length of the wire with the passage of time and with passage of current, thus changing the effective length of the resistance wire which is in circuit between its terminals. The effective lengths of the resistance wires in circuit between the terminals advantageously remains constant in the illustrative embodiments of the invention described herein.

These resistors described herein lend themselves readily to all of the conventional packaging techniques such as oil immersion, potting, wax coating, and encapsulation, and also to the improved encapsulation procedures described herein as illustrative embodiments of the present invention. This encapsulation procedure provides a completely sealed pocket enclosing the resistance wire. The main body of the resistance winding remains entirely free if the encapsulating material and yet is entirely protected thereby. In certain instances this pocket contains air or suitably treated gases and in other instances this pocket is filled with a protective oil which bathes the resistance wire and further protects it. The fluid, gas or liquid, within this pocket thus advantageously isolates the resistance wire from mechanical stresses which may be present in the encapsulating material and by convection serves to cool the resistance wire.

In this specification and in the accompanying drawings, are described and shown methods and apparatus embodying my invention and various modifications thereof are indicated, but it is to be understood that these are given for purposes of illustration in order that others skilled in the art may fully understand the invention and the manner of applying the methods and apparatus in practical use so that they may modify and adapt them in various forms, each as may be best suited to the conditions of a particular electrical application.

The various objects, aspects, and advantages of the present invention will be more fully understood from a consideration of the following specification in conjunction with the accompanying drawings, in which:

FIGURE 1 is a perspective view of a precision resistor embodying the present invention wherein the ends of the resistance wire are butt-welded to the terminals;

FIGURE 2 illustrates a method of making the butt-welded connection at one end of the resistance wire;

FIGURE 3 is a perspective view of another embodiment of the present invention utilizing a different form of butt-welded terminal connection for the resistance wire;

FIGURE 4 is an enlarged elevational view shown partially in section, illustrating the terminal connection;

FIGURE 5 is a view similar to FIGURE 2 illustrating a different terminal connection and method of making;

FIGURE 6 is an enlarged elevational view shown partially in section of a resistor incorporating a different form of butt-welded end termination;

FIGURE 7 is an end elevational view of the resistor of FIGURE 6;

FIGURES 8, 9 and 10 illustrate one form of encapsulated precision resistor embodying the present invention and show steps in the methods of fabrication. FIGURE 10 is a cross sectional view of FIGURE 9 taken along the line 9—9;

FIGURES 11, 12, 13, and 14 illustrate another form of encapsulated precision resistor embodying the present invention and show steps in the methods of fabrication. FIGURE 14 is a cross sectional view of FIGURE 13 taken along the line 14—14; and FIGURE 15 is a diagrammatic illustration of the shortcomings I have found to be present in prior art terminations of the soldered type.

The resistor 20 shown in FIGURE 1 includes a ceramic spool or bobbin 21 having five flanges 22 integrally formed on a generally cylindrical hollow winding core support 24. The resistance wire 26 is wound on the cylindrical support 24 with approximately equal lengths lying in each of the four annular winding channels 26, 27, 28, and 29 between the respective flanges.

In order to reduce the effective inductance of the resistance winding, the directions of winding of the portions of the wire lying in adjacent winding channels is reversed. In passing from one winding channel to the next, the wire runs through a slot 30 in the intervening flange and reverses its direction as shown in the drawing, in entering the next channel. The slots 30 extend the full depth of the flanges and are axially aligned.

A pair of terminals 31 and 32 are fixed at opposite ends of the bobbin. Each of these terminals includes an extending outer contact lug 34 for making external electrical connections and for mounting the resistor. The inner ends of these terminals have fastening rings 36 which snugly fit around the extending end portions of the core 24. For purposes of holding these terminals 31 and 32 firmly in place, a C-shaped retaining clip 38 is snapped into a groove in the extending end of the core against the outside of the ring portion 36. In this illustrative embodiment of the invention, the terminals are shown as being tin coated electrical copper material. The resistance wire 26 is insulated resistance wire such as is commerically available and specific examples of suitable wire are discussed in detail further below.

In order to make a connection at the ends of the wire 26, as illustrated in FIGURE 2, a butt-weld is formed between each end of the resistance wire and a terminal lug 40 of suitable material. For example, this terminal lug 40 is formed of Phosphor-bronze and is suitably secured, for example, by soldering or brazing, at 42 to a tab 43 which projects on the opposite rim of ring 38 from the external terminal end 34. The purpose of this lug 40 is to provide suitable material to which to butt-weld the end of the resistance wire. Phosphor-bronze or nickel material serve extremely well for this use. It is also possible to use a terminal material which is the same as that of the resistance wire. However, for most applications Phosphor-bronze material has been found to be most satisfactory from all considerations including its ease of fabrication and handling.

In certain instances the entire terminal 31 or 32 can be stamped out of Phosphor-bronze or other suitable material. However, the arrangement as illustrated is very satisfactory. The lug piece 40 serves as a transistion between the high resistance end of the resistance wire and the highly conductive material of the terminals 31 and 32.

It will be noted that the lug piece 40 is secured to the inner side of the tab 43. Thus, any solder or brazing material engages only the outer surface of the lug piece 40, and its inner surface remains smooth and clear for proper welding action.

Generally, the procedure for assembly of the resistor is to butt-weld the end of the resistance wire to the lug 40 on one of the terminals, then to wind the wire onto the bobbin, then to age the resistance wire, next to trim the free end of the wire to the desired length and weld it to the opposite lug piece 40. For example, in making a butt-weld at the second end of the wire when the winding operation has been completed as shown in FIGURE 2, the wire must be trimmed so as to give the precisely desired length after it has been welded to the lug 40. In order to obtain this precisely desired length after welding, a small allowance of an added increment of length must be made for wire which becomes fused and thus consumed in the welding operation. This allowance is less than .005 of an inch.

After trimming, the enamel or other insulation material is scraped from or otherwise removed from the wire end as shown at 44, for a length of about one-quarter of an inch. The bared wire is grasped between a pair of electrically conductive tweezers 46 connected by a lead 47 in circuit in series with a current limiting resistor 48 and a charged capacitor 50. A lead 51 completes the circuit from the opposite side of this capacitor to the terminal 32. The tweezers are used to touch the end of the wire 26 substantially perpendicularly against the clear surface of the lug 40. An arc is created at the end of the wire as the capacitor 50 is discharged. The magnitude of the current flow through the arc is limited by the resistor 48 to obtain the desired welding action.

As a result of this process, a precisely controlled weld is obtained and the desired value of the resistance wire between the two lugs 40 is advantageously provided with an accuracy of better than one part per million. There is no requirement for the addition of auxiliary resistance wire to reach the desired value.

To obtain highly satisfactory welding action, I have found the following circuit values to be successful in conjunction with these materials:

| Wire Material | Wire Diam. | Lug Material | Voltage V | Capacitance C, μf. | Resistance R, ohms |
|---|---|---|---|---|---|
| Evanohm | .001 | Ph-B | 300 | 1 | 25 |
| Do | .002 | Ph-B | 300 | 2 | 25 |
| Do | .004 | Ph-B | 300 | 8 | 25 |
| Karma | .001 | Ph-B | 300 | 1 | 25 |
| Do | .002 | Ph-B | 300 | 2 | 25 |
| Do | .004 | Ph-B | 300 | 8 | 25 |
| Manganin | .001 | Ph-B | 300 | 1 | 50 |
| Do | .002 | Ph-B | 300 | 2 | 50 |
| Do | .004 | Ph-B | 300 | 8 | 50 |
| Advance | .001 | Ph-B | 300 | 1 | 50 |
| Do | .002 | Ph-B | 300 | 2 | 50 |
| Do | .004 | Ph-B | 300 | 8 | 50 |

Evanohm enamel-coated resistance wire is obtainable commercially from Wilbur B. Driver Co. of Newark, New Jersey and Karma enamel-coated resistance wire from Driver-Harris Co. of Harrison, New Jersey. Suitable resistance wires, such as these, have a composition approximately of 75% nickel, 20% chromium, 2.5% aluminum and 2.5% copper. Other suitable resistance wires sold by Wilbur B. Driver Co. are: Tophet "A" having a composition approximately of 80% nickel and 20% chromium; and Tophet "C" having approximately a composition of 60% nickel, 15% chromium and 25% iron. Another very suitable resistance wire is sold by Driver-Harris Co. under the name Nichrome and has a composition of approximately 60% nickel, 15% chromium and 25% iron. These all require approximately a 25 ohm current-limiting resistor.

Manganin enamel-coated resistance wire is obtainable commercially from Wilbur B. Driver Co. and Advance from Driver-Harris and they require approximately a 50 ohm current limiting resistor.

By following this procedure the operator is enabled to determine in advance of butt-welding the effective point of connection to the terminal with a precision tolerance commensurate with the diameter of the wire itself, usually resulting in an over-all precision of better than one part per million in resistance value. Because the location of the effective points of terminal connections are thirty times more precisely determined, this invention enables the making of resistors containing only one-thirtieth the length of wire and yet having a precision equal to or better than prior resistors. By virtue of the shorter wires used, these resistors have far less inductance and capacitance than prior resistors of the same precision.

For resistors having a resistance value below 10,000 ohms, it is usually preferable to utilize a resistance wire having a diameter of at least .004 of an inch. In the range between 10,000 ohms and 100,000 ohms, a diameter of .002 of an inch is preferable; and above 100,000 ohms, .001 of an inch is preferable.

In the remaining figures of the drawings corresponding reference numerals are used for parts performing corresponding functions. Parts performing similar functions have the same reference numeral following by an appropriate letter. As shown in FIGURES 3 and 4 the bobbin 21a is similar to the ceramic bobbin 21, but is formed of an epoxy resin material. The resistance wire 26 is passed through aligned slots 30 in the flanges 22.

In order to terminate the resistance wire, the bared end portions 44 are butt-welded to the clear inner surfaces of short lug rods 40a of Phosphor-bronze, nickel, or other suitable material whose outer ends are soldered at 42 to the respective ring portions 36 of the external terminals 31 and 32. These terminal lugs 40a extend inwardly through holes 52 in the respective end flanges 22a and project inwardly a short distance from the inner surface of the flange for accessibility in making the butt-weld.

The resistor of FIGURE 5 is generally similar to that shown in FIGURES 1 and 2 except that the lug piece 40 is just slightly narrower than the slot 30 in the end flange 22. The butt-weld connection between the bared end 44 and the lug piece 40 is made near the free end of this lug piece. After the weld is completed, the lug piece 40 is bent inward through the slot 30 so that it becomes depressed below the perimeter of the bobbin flanges. Dotted lines indicate the position of welded wire end 44 and lug piece 40 prior to the bending operation.

In the high precision resistor of FIGURES 6 and 7 the bobbin 21b is of epoxy resin and is identical with that shown in FIGURES 3 and 4 except that the end flanges 22 are slotted at 30 instead of having terminal lug holes as at 52 in FIGURE 3. To form the termination for the resistance wire, a short lug rod 40b is used having a diameter snugly fitting into the slot 30. This lug rod 40b is secured to the inner face of the terminal tab 43 and advantageously acts to plug up the slot 30, which is helpful in the encapsulation discussed below. The butt-welded connection is made to the inner side of the cylindrical surface of this radially extending lug rod 40b.

The assembled resistors in FIGURES 3–7, as shown lend themselves to the encapsulation steps described hereinafter, because none of the terminal portions project beyond the periphery of the flanges except for the two outer terminal end connections 34. Moreover, the slots 30, or holes 30a, as the case may be, in the end flanges are purposefully obstructed by the arrangement of the terminals themselves, for reasons explained below.

The encapsulating material which is described herein by way of example is epoxy resin. So, it is more advantageous to use a spool or bobbin 21a or 21b of epoxy material, whereby the temperature expansion coefficients of encapsulating material and bobbin match. However, by virtue of the fact that the resistance wire is bathed in a fluid within a pocket in the capsule, it is isolated from any undesirable effects arising from stresses or strains in the encapsulating material itself. Thus, a ceramic bobbin 21 also can be used.

As a first step in the encapsulation procedure, the outer ends 34 of the terminals 31 and 32 are held upwardly and an impervious plastic film 56 is applied as a cylindrical sleeve tightly embracing the flanges 22 and forming a completely enclosed annular pocket 58 within the sleeve 56. This pocket is divided into four parts by the intervening flanges 22, but these all communicate with one another through the slots 30 in the flanges.

A convenient way to form this impervious sleeve 56 is to wind around two or three layers of pressure-sensitive adhesive-coated Mylar tape, or cellophane tape, such as "Tuck" tape or "Scotch" tape, having a width matching the distance between the end flanges.

Then the resistor is encapsulated in epoxy resin 59, as shown in FIGURE 9, forming a protective capsule for the resistor unit and providing added mechanical support for the terminals 31 and 32. Entry of any of the encapsulating material into the pocket 58 is prevented by the terminals which obstruct the openings in the end flanges.

As a final step, the ends of the capsule are cut off along the planes 61 and 62 perpendicular to the axis of the bobbin and flush with the ends of the hollow core 24. This minimizes the axial length of the units and facilitates their end-to-end mounting. Where desired a non-magnetic mounting rod is passed through the hollow core 24.

As a result of this encapsulation procedure air is the fluid medium which bathes the resistor wire within the enclosed pocket 58. By convection this fluid aids in carrying away heat from the wire when in use. To obtain a dry air bath, a suitable desiccant, such as silica gel, is introduced into the pocket before the tape 56 is wound in place.

FIGURES 11–14 illustrate a method of fabrication wherein transformer oil is utilized substantially filling the annular pocket 58. After the impervious sleeve 56 is applied, epoxy resin is cast around the resistor up to a level 65 approximately two-thirds way between the top of the winding 26 and the periphery of the flanges 22, so as to leave only a narrow portion of the sleeve 56 exposed at the top. This casting of the encapsulating material 59 includes the steps of pouring it into a mould around the sleeve 56 and curing it. Then, after curing the material 59, a hypodermic 66 is utilized to inject oil into the pocket 58 through the remaining narrow exposed portion of the sleeve 56. This flows through the slots 30, which are aligned at the lowermost point because the terminals 31 and 32 are held up vertically, and thus the oil substantially entirely fills the pocket 58. The displaced air escapes through the needle hole in the sleeve 56, which is purposely somewhat enlarged, and through small pin holes over the other winding channels. Thereafter, as shown in FIGURES 13 and 14 further resin material 59' is cast above the level 65 to complete the encapsulation of the unit. The holes in the sleeve 56 used to inject the oil are suitably plugged, for example, they are covered with a patch of plastic tape before the material 59' is cast in place. Finally, the excess encapsulating material is cut off from the ends flush with the ends of the core 24. Suitable epoxy encapsulating material is obtained from Houghton Laboratories, Inc. of Olean, New York.

A suitable aging procedure for stabilizing the resistance characteristics of the wire includes the following steps:

(A) 1—Maintain 2 hours at 0° C.
    2—Maintain 2 hours at −50° C.
    3—Maintain 2 hours at 100° C.
    Repeat these three steps in sequence five times each.

(B) 1—Maintain rated current through the wire for 24 hours steadily.
    2—No current through the wire for 24 hours.
    Repeat these two steps in sequence five times each.

(C) Repeat A steps in sequence five times each.

(D) Allow to stand at room temperature for 2 months.

Highly suitable ceramic bobbins 21 are obtainable from Thor Ceramics, Inc. of Bloomfield, New Jersey, and epoxy resin bobbins from Norrich Plastics Corp., of New York City, New York.

To emphasize further the advantages of the butt-welded termination for the wire, attention is directed to FIGURE 15 showing a resistance wire 70 wrapped around a bifurcated terminal lug 72 and encased in a solder bead 74. It will be appreciated that the specific resistivity of the wire 70 is many times larger than that of the bead. Thus, the effective point of connection of the wire 70 to the terminal 72 is the point on the wire furthest from the terminal at which a good electrical connection exists between the wire 70 and the bead 74. Initially this effective point of contact is at 76 at the surface of the solder bead. However, by some deteriorating action or other such as oxidation, I find that a barrier to conduction builds up around the high resistance wire at its point of entry 76. And so, the effective point of contact begins to creep inwardly along the length of the wire within the solder, as indicated by the arcuate arrow. At some subsequent period of time this effective point of contact often will have moved to at least point 78 which is a substantial distance from the point of entry at 76. At a result, the length of wire between 76 and 78 is added to the resistor, and this can often amount to more than one-tenth of an inch. Moreover, this movement of the effective contact point is erratic, and varies with use and time, sometimes jumping ahead or retracting backwardly, causing a varying resistance value. None of these undesirable effects are present in the butt-welded terminations described herein.

From the foregoing it will be understood that the embodiments of the precision resistance apparatus and methods of making of the present invention described above are well suited to provide the advantages set forth, and since many possible embodiments may be made of the various features of this invention and as the method and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. A method of making an oil filled encapsulated wire wound resistor comprising the steps of, winding a resistance wire intermediate the ends of a spool member, connecting terminal means to the individual ends of said winding, wrapping a material around said wire wound spool member to form a sleeve encasing said winding from one end of the winding to the other end thereof, said sleeve and spool member co-operating to form a relatively hollow pocket occupied by the winding of resistance wire, surrounding the ends of the wire wound spool and also surrounding a substantial portion of said sleeve with an outer protective encapsulating material so as to leave a portion of said sleeve temporarily uncovered, injecting an oil fluid into said pocket through said uncovered sleeve portion so as to immerse said winding of resistance wire contained in said pocket in an oil bath, and surrounding said uncovered sleeve portion with said encapsulating material to complete encapsulation of said wire wound resistor.

2. A method as claimed in claim 1 further including, the step of, forming pin-like holes in said uncovered portion of said sleeve to allow escape of air therethrough from said pocket while said pocket is being filled with said oil.

3. A method of making an oil filled encapsulated wire wound resistor comprising the steps of, winding a resistance wire on a spool member having individual flanges at its ends, said winding being located intermediate said end flanges, connecting terminal means to the individual ends of said winding, wrapping a material around said wire wound spool to form a sleeve encasing said winding from one end flange to the other, said sleeve and spool member cooperating to form a relatively hollow pocket occupied by the winding of resistance wire, surrounding the ends of the wire wound spool and also surrounding a substantial portion of said sleeve with an outer protective encapsulating material so as to leave a portion of said sleeve temporarily uncovered by encapsulating material, injecting an oil fluid into said pocket through said uncovered portion of said sleeve so as to immerse the winding of resistance wire contained in said pocket in an oil bath, said sleeve material being puncturable by a needle like injector for injecting the oil bath into said pocket, and surrounding the uncovered portion of said sleeve with said encapsulating material to complete encapsulation of said wire wound resistor, said terminal means having portions projecting from said protective encapsulating material to permit electrical terminal connections thereto.

4. A liquid filled and encapsulated resistor comprising, a winding spool having axially spaced apart ends, a winding of resistance wire of selected diameter along said spool, said winding, being located intermediate the ends of said spool, terminal means of conductive material along said spool, said resistance wire having individual ends for making substantially perpendicular butt-weld point terminations with correlated ones of said terminal means, the area of said terminal means being many times larger than the area of the resistance wire end terminating thereto and the resistivity of said terminal means being comparable to the resistivity of said resistance wire to accomplish the aforesaid butt-weld terminations and also to achieve terminal means of negligible resistance in comparison to the resistance of the resistance wire, said terminal means having portions for making electrical terminal connections to additional terminal means of negligible resistance in comparison to the resistance of said winding, a sleeve wrapped around said wire wound spool from one end thereof to the other, said sleeve and said spool cooperating to define a hollow pocket containing said winding, outer means of protective material permanently encasing the ends of said spool and said sleeve for encapsulating said resistor and preventing further entry into said pocket, and an oil contained in said pocket, said winding being immersed in said oil, whereby said winding is isolated from mechanical stresses occurring in said encapsulating material.

5. Apparatus as defined in claim 4 wherein, said sleeve is made of a material which is puncturable to permit the injection of oil therethrough for filling said pocket with said oil prior to encapsulating the entire resistor.

References Cited in the file of this patent

UNITED STATES PATENTS

| 547,979 | Whittingham | Oct. 15, 1895 |
|---|---|---|
| 1,551,974 | Brummett et al. | Sept. 1, 1925 |
| 2,332,255 | Podolsky | Oct. 19, 1943 |
| 2,547,405 | Mitchell et al. | Apr. 3, 1951 |
| 2,684,428 | Bixler | July 20, 1954 |

FOREIGN PATENTS

| 566,559 | Great Britain | Jan. 3, 1945 |